June 2, 1942.　　O. J. SUNDSTRAND　　2,285,311
ACCOUNTING MACHINE
Original Filed June 30, 1936　　12 Sheets-Sheet 1

Inventor

OSCAR J. SUNDSTRAND

By L. G. Julihn

Attorney

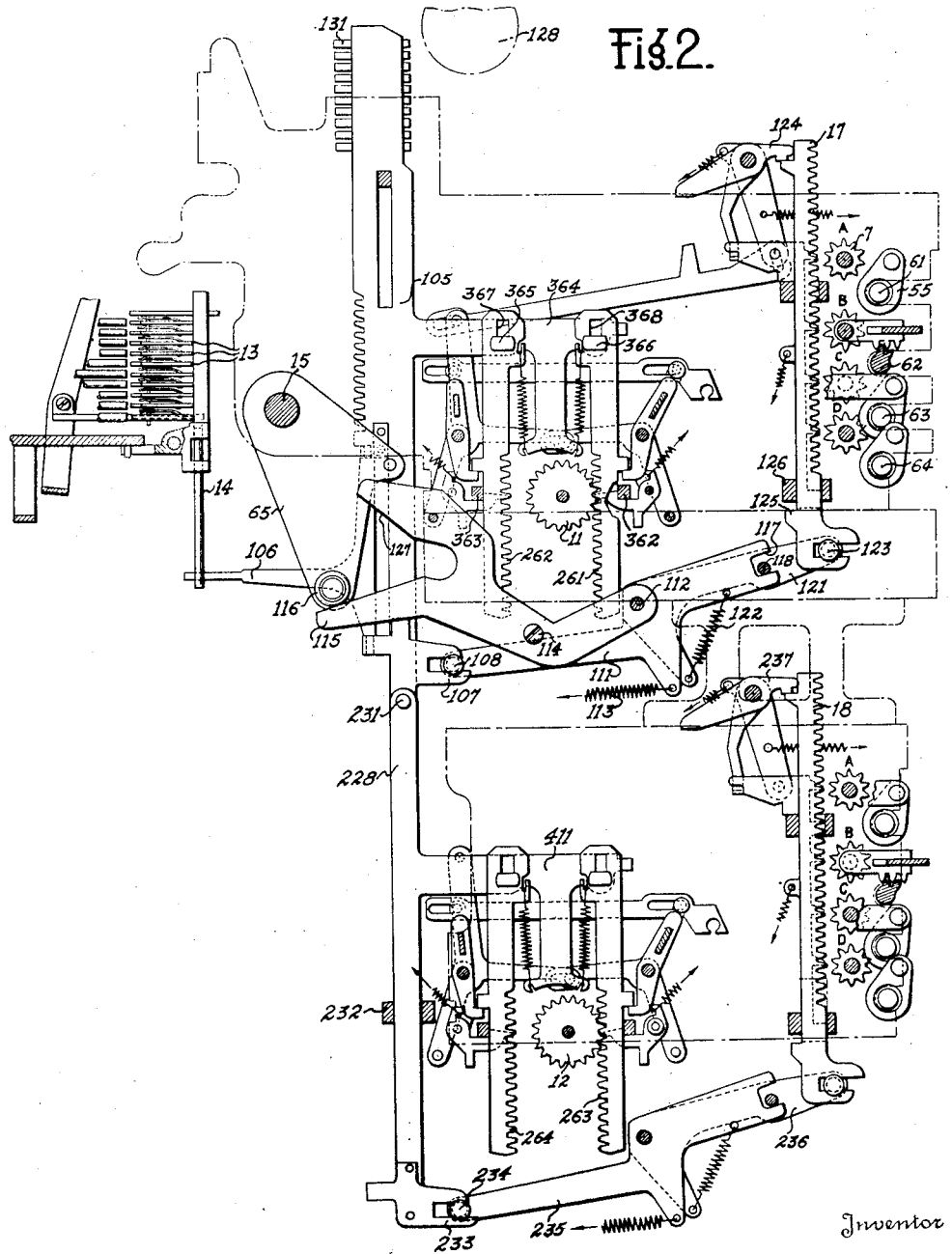

June 2, 1942.   O. J. SUNDSTRAND   2,285,311
ACCOUNTING MACHINE
Original Filed June 30, 1936   12 Sheets-Sheet 3
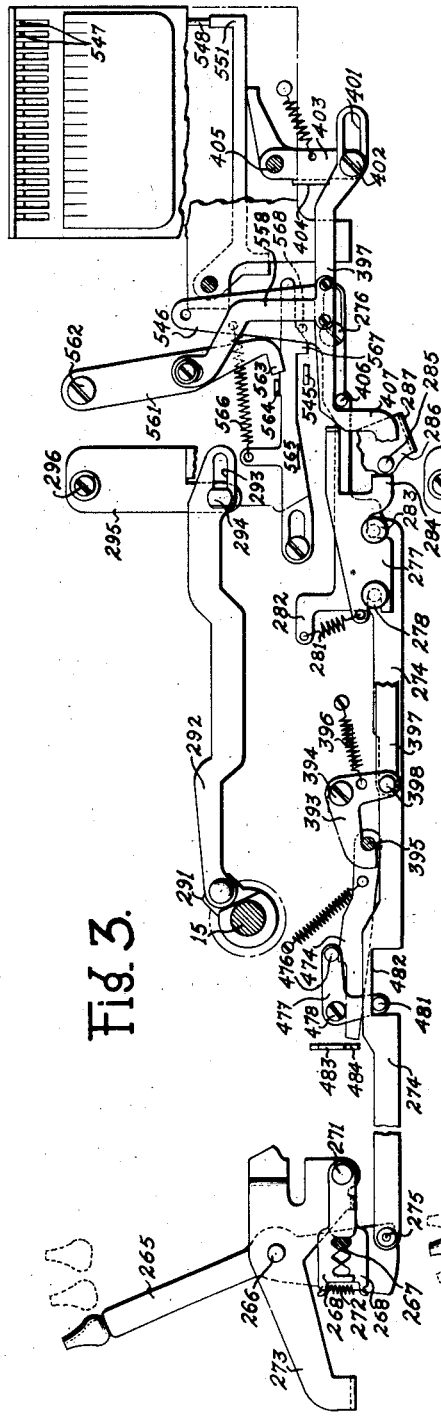
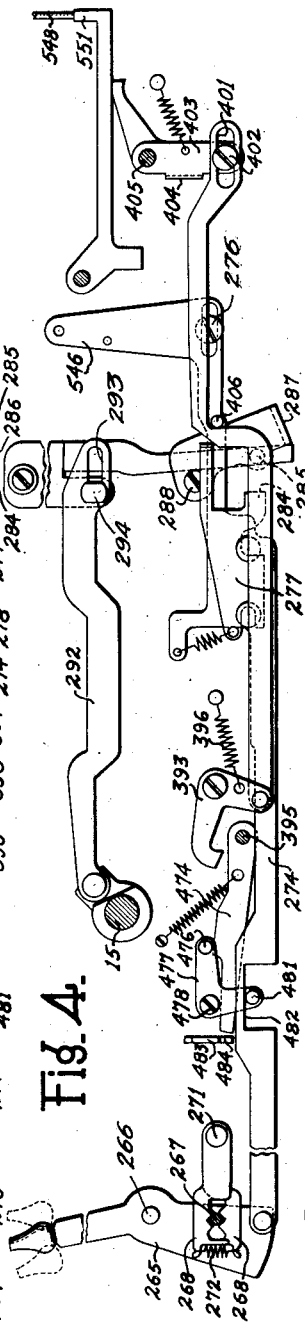
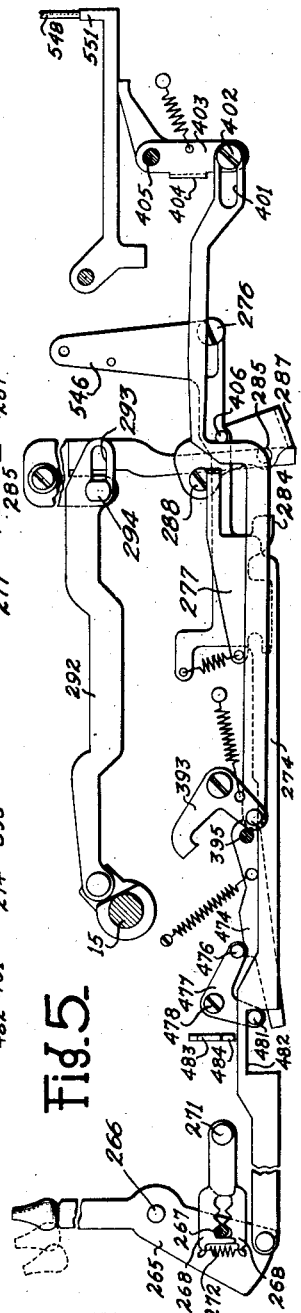
INVENTOR
OSCAR J. SUNDSTRAND.
BY
ATTORNEY June 2, 1942.　　O. J. SUNDSTRAND　　2,285,311
ACCOUNTING MACHINE
Original Filed June 30, 1936　　12 Sheets-Sheet 4

INVENTOR
OSCAR J. SUNDSTRAND.
BY
ATTORNEY

June 2, 1942. O. J. SUNDSTRAND 2,285,311
ACCOUNTING MACHINE
Original Filed June 30, 1936 12 Sheets-Sheet 5
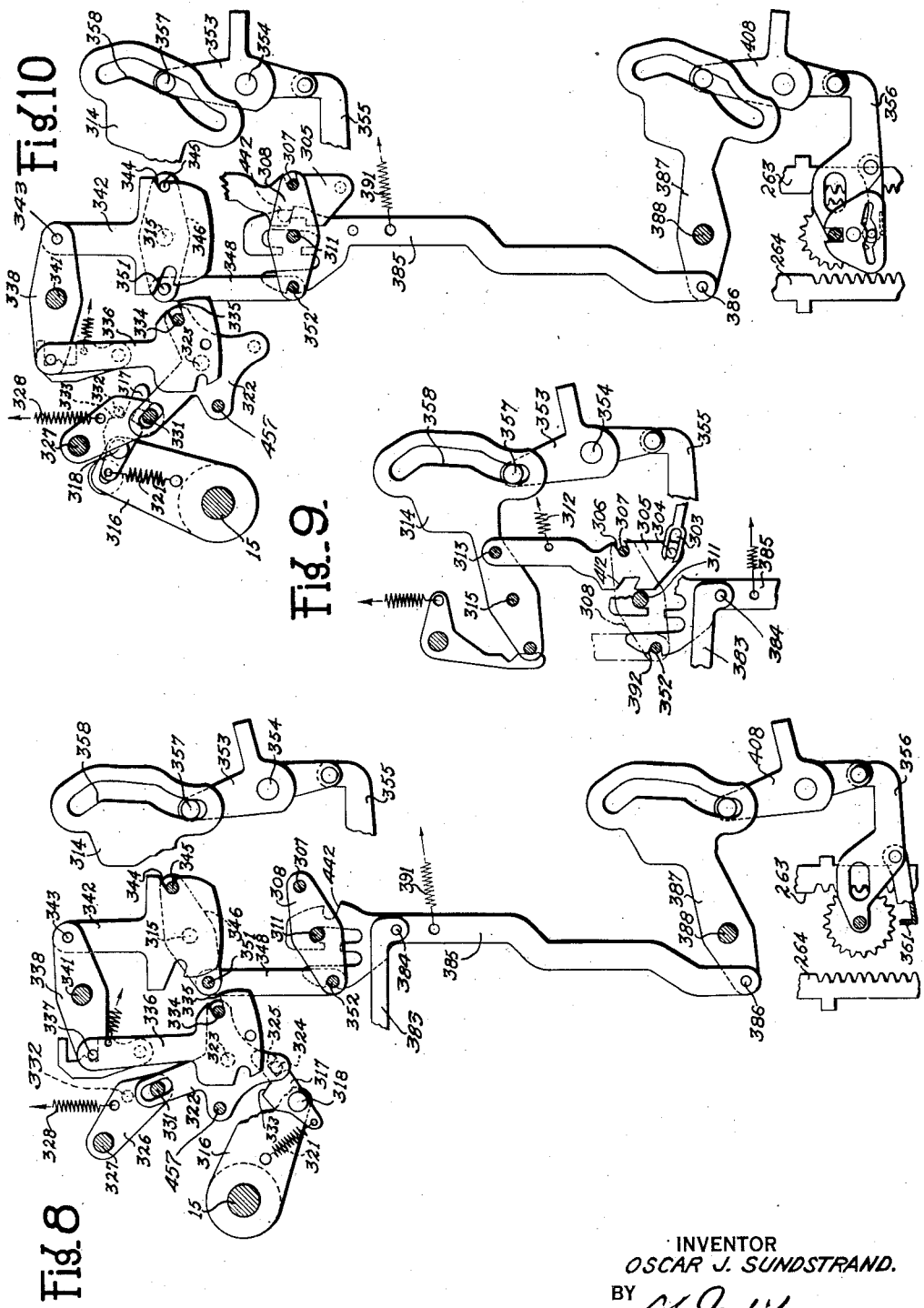
INVENTOR
OSCAR J. SUNDSTRAND.
BY
ATTORNEY June 2, 1942. O. J. SUNDSTRAND 2,285,311
ACCOUNTING MACHINE
Original Filed June 30, 1936 12 Sheets-Sheet 6

INVENTOR
OSCAR J. SUNDSTRAND.
BY
ATTORNEY

June 2, 1942.    O. J. SUNDSTRAND    2,285,311
ACCOUNTING MACHINE
Original Filed June 30, 1936    12 Sheets-Sheet 7

INVENTOR
OSCAR J. SUNDSTRAND:
BY
ATTORNEY

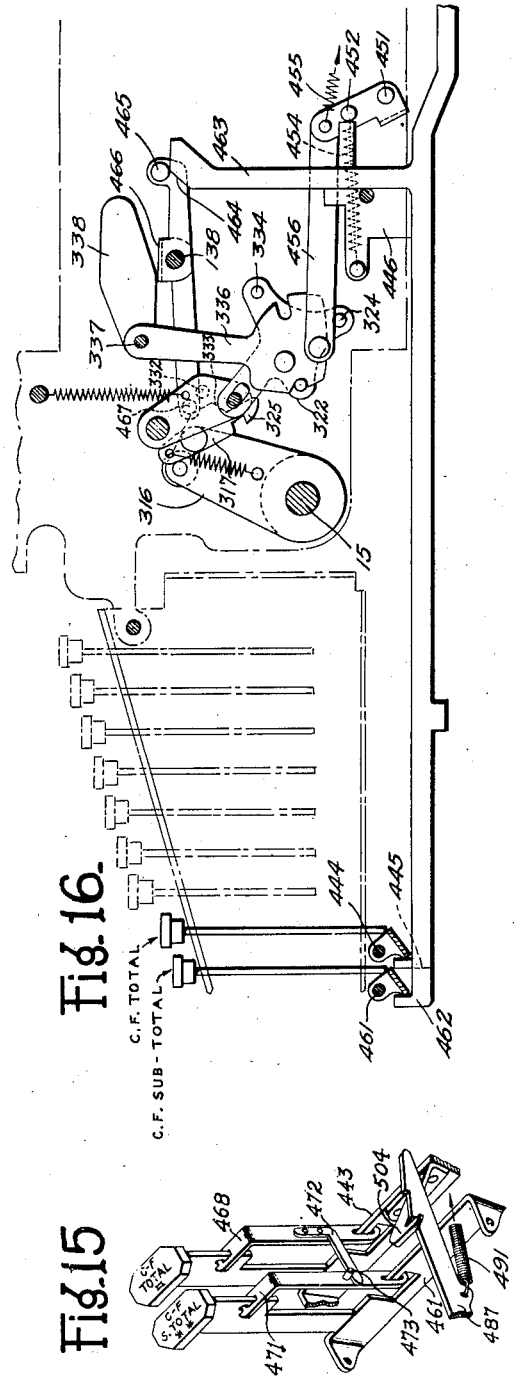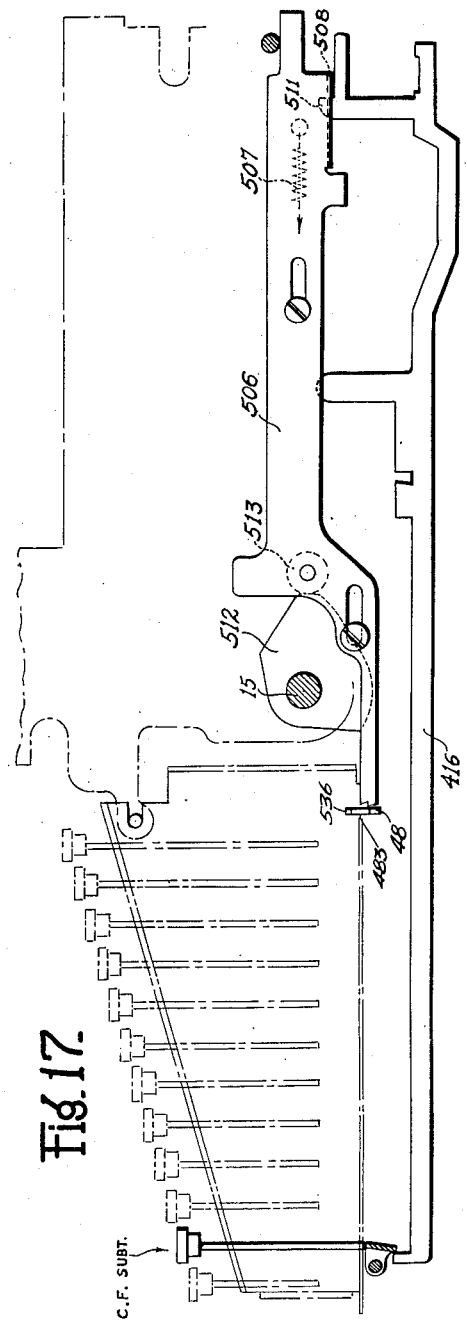

June 2, 1942.　　O. J. SUNDSTRAND　　2,285,311
ACCOUNTING MACHINE
Original Filed June 30, 1936　　12 Sheets-Sheet 9
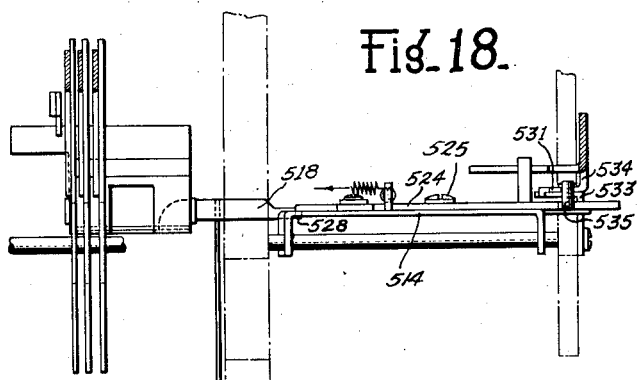
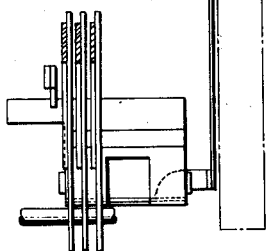
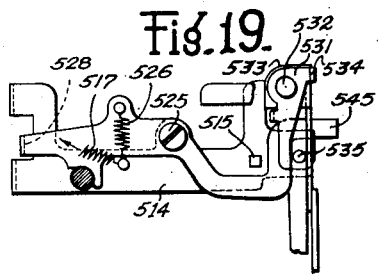
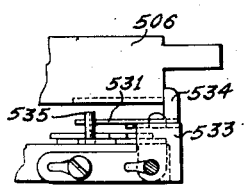
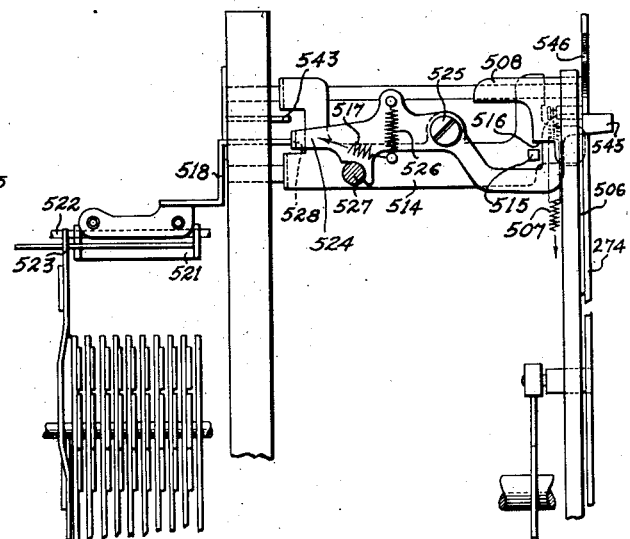
INVENTOR
OSCAR J. SUNDSTRAND.
BY
ATTORNEY June 2, 1942.    O. J. SUNDSTRAND    2,285,311
ACCOUNTING MACHINE
Original Filed June 30, 1936    12 Sheets-Sheet 10
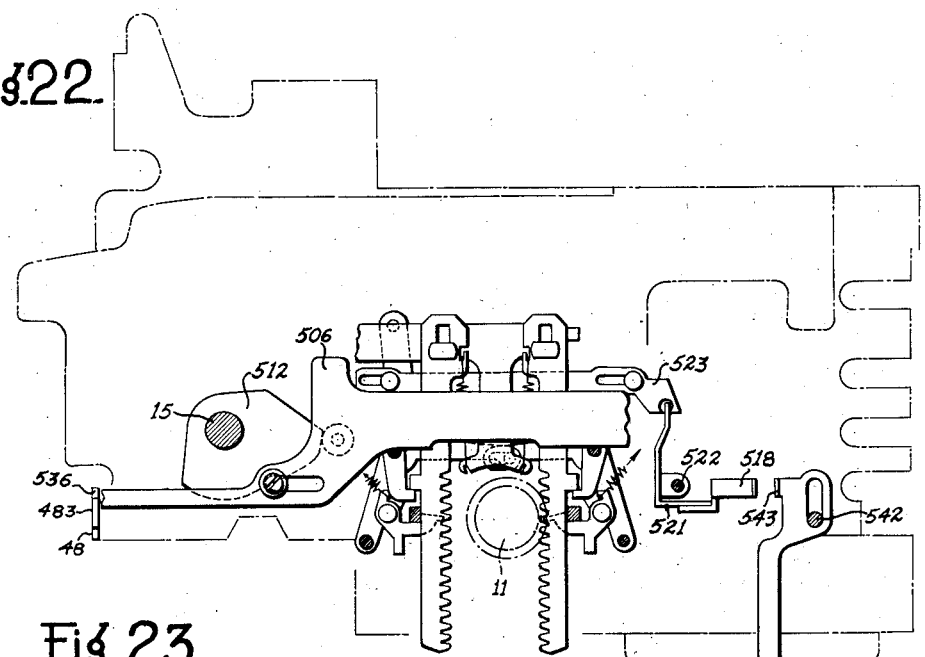
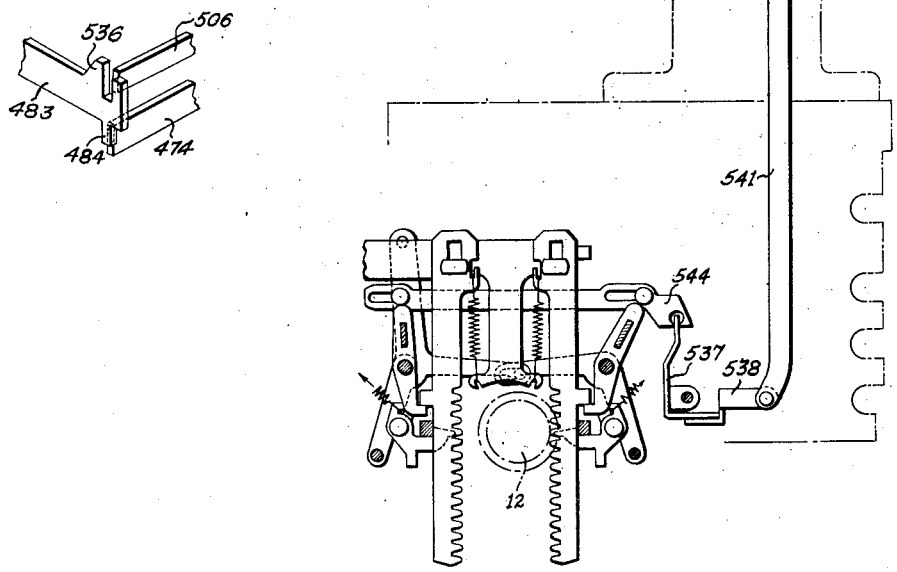
INVENTOR
OSCAR J. SUNDSTRAND.
BY
ATTORNEY June 2, 1942.　　　O. J. SUNDSTRAND　　　2,285,311
ACCOUNTING MACHINE
Original Filed June 30, 1936　　12 Sheets-Sheet 11
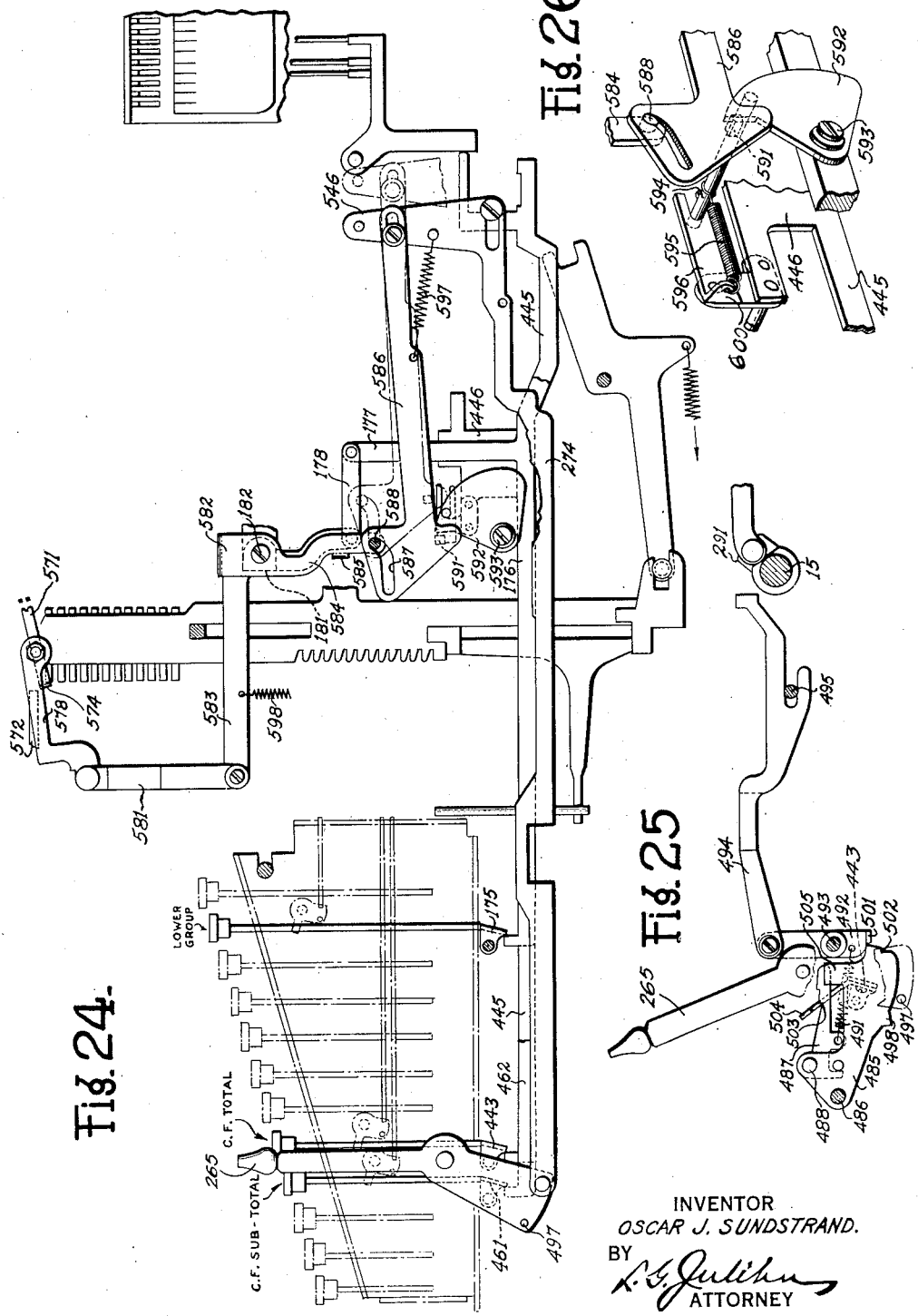
INVENTOR
OSCAR J. SUNDSTRAND.
BY
ATTORNEY

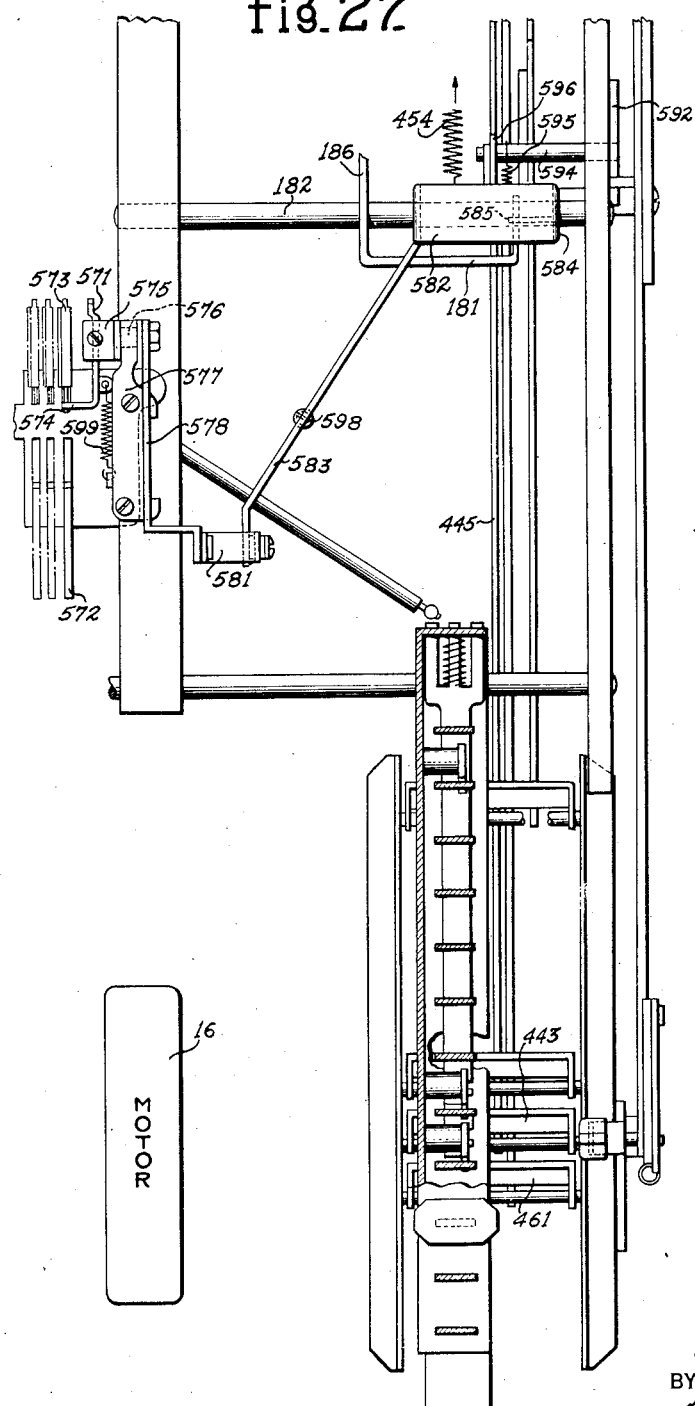

Patented June 2, 1942

2,285,311

UNITED STATES PATENT OFFICE 2,285,311

ACCOUNTING MACHINE

Oscar J. Sundstrand, West Hartford, Conn., assignor to Underwood Elliott Fisher Company, New York, N. Y., a corporation of Delaware Original application June 30, 1936, Serial No. 88,092. Divided and this application December 29, 1939, Serial No. 311,699

3 Claims. (Cl. 235—60)

This invention relates to accounting machines and more particularly to the key set, motor operated type.

The primary object of the present invention is to provide a machine with two crossfooters adapted to be either independently or jointly operated, together with suitable controls therefor, to adapt the machine to handle complex accounting problems.

With this and incidental objects in view, the invention consists in certain novel features of construction and combinations of parts, the essential elements of which are set forth in appended claims, and a preferred form of embodiment of which is hereinafter described with reference to the drawings which accompany and form part of the specification.

In said drawings:

Figure 1 is a perspective of the entire machine,

Figure 2 is a right side elevation showing the adding registers, the crossfooters, the type bars and actuating mechanism for each, Figure 3 is a right side elevation showing the lever for selecting either or both of the crossfooters (in this figure it is shown in its position for selecting the upper crossfooter), Figure 4 is a right side elevation similar to Figure 3 and shows the position of certain of the parts shown in Figure 3 when the crossfooter selecting lever is in its position for selecting the upper and lower crossfooters for joint operation, Figure 5 is a right side elevation similar to Figure 3 and shows the position of certain of the parts shown in Figure 3 when the crossfooter selecting lever is in its position for selecting the lower crossfooter.

Figure 6 is a right side elevation similar to Figure 3 and shows the position of certain of the parts shown in Figure 3 when the lower crossfooter is selected by the paper carriage, Figure 7 is a right side elevation showing parts of the mechanism for selectively engaging the crossfooters and also shows the connections for causing amounts to be added in one of the crossfooters while being subtracted in the other, Figures 8 and 9 are right side elevations of the parts used to engage the crossfooters for actuation, Figure 10 is a view similar to Figure 8 showing the parts in the positions occupied at the middle of the operation, Figure 11 is a right side elevation showing the mechanism used to cause subtraction in the crossfooters, Figure 12 is a view similar to Figure 11 showing the parts in the positions they occupy at the middle of the operation, Figure 13 is a right side elevation showing certain of the parts used in taking a total from the crossfooter, Figure 14 is a view similar to Figure 13 showing certain of the parts not included in Figure 13, Figure 15 is a detailed perspective of the crossfooter total and sub-total keys, showing the connection for automatically depressing the total key upon manual depression of the sub-total key, and also showing certain of the elements used in locking the total keys against depression under certain conditions, Figure 16 is a right side elevation showing certain of the parts, used in a total taking operation, in the positions they occupy at the middle of the operation, Figure 17 is a right side elevation showing certain of the parts used in automatically taking a negative or overdraft total, Figure 18 is a front elevation of certain of the parts used in taking a negative total, Figure 19 is a plan view from the front of the machine showing certain of the parts shown in Figure 18, Figure 20 is a right side elevation showing certain of the parts shown in Figures 18 and 19, Figure 21 is a plan view from the front of the machine showing the parts shown in Figures 18, 19 and 20, Figure 22 is a right side elevation showing certain of the parts shown in Figure 18 and showing the connections between these parts and the crossfooters, Figure 23 is a perspective of parts of a lock between the amount keyboard, the negative total mechanism, and the selecting mechanism for the lower crossfooter, Figure 24 is a right side elevation showing the parts used in printing a designating signal for the lower registers and crossfooter, Figure 25 is a right side elevation of the locking mechanism used to prevent depression of the total keys under certain conditions, Figure 26 is a detailed perspective of certain of the parts shown in Figure 24, and Figure 27 is a plan view from the front of the machine of the parts shown in Figure 24.

General Description

This machine is an improvement on my copending application, Serial No. 581,800, filed December 18, 1931, now Patent No. 2,194,270, and is a division of my application Serial No. 88,092, filed June 30, 1936, now Patent No. 2,209,240.

The machine includes the customary keyboard with amount keys, date setting keys, and totalizer and printer controlling keys. It has a traveling paper carriage automatically adjustable to a series of columnar positions, together with return mechanism operable automatically at a predetermined point in the carriage travel. The carriage includes a control plate carrying a series of magazines with control lugs for automatically controlling the numerous operations that are controlled manually by the key-board. The carriage illustrated in the drawings is of the combined front and rear feed type.

The machine includes eight adding registers and two crossfooters, four registers and one crossfooter beeing located in what will be termed the upper group, and the other four registers and crossfooter being located in what will be termed the lower group. All the registers and crossfooters are actuated by a common set of actuators adjustable under control of pins set by the amount keys. The actuators also control the adjustment of type for printing amounts and totals.

Each group of four adding registers has separate transfer elements, and the crossfooters likewise have separate sets of transfer elements, the crossfooters also having overdraft mechanism to control the printing of negative balances.

Selection of the adding registers is performed by depression of one of four keys to select a particular register in the upper or lower group, and the group in which the desired register is located is selected by the depression of a fifth key. Totals are taken from the adding registers by depressing the proper selecting keys, operating the machine through a blank cycle, then depressing the register total key and again operating the machine. Sub-totals are taken from the adding registers in the same manner as totals except that the register non-add key is depressed jointly with the register total key.

The crossfooters are selected by a separate lever operating independently from the selecting means for the adding registers. In its normal forward position this lever selects the upper crossfooter. When moved one step to its intermediate position it selects both the upper and lower crossfooters, and when moved an additional step to its rear position it selects the lower crossfooter. A separate key is provided for the purpose of subtracting in the selected crossfooters, and another key is provided for the purpose of subtracting in one crossfooter while adding in the other. If it is desired to add in the upper crossfooter and subtract in the lower, a key that will be termed the crossfooter plus and minus key is depressed with the crossfooter selecting lever in either its normal or intermediate position and the machine operated, and if it is desired to subtract in the upper and add in the lower, the same manipulation is repeated except that the subtraction key also is depressed. For the purpose of total taking the mechanism is arranged so that totals may be taken from the upper crossfooter when the lever is in either its normal or intermediate position and from the lower crossfooter when it is in its rear position. To take totals from the crossfooters the selecting lever is moved to the desired position and a blank cycle taken. The crossfooter total or sub-total key is then depressed and the machine again operated. If the machine contains an overdraft balance the correct algebraic amount is automatically printed.

A mechanism is also provided to print a special signal when the adding registers of the lower group are engaged for actuation or when the lower crossfooter is engaged for total taking.

Detailed Description

Figure 1:
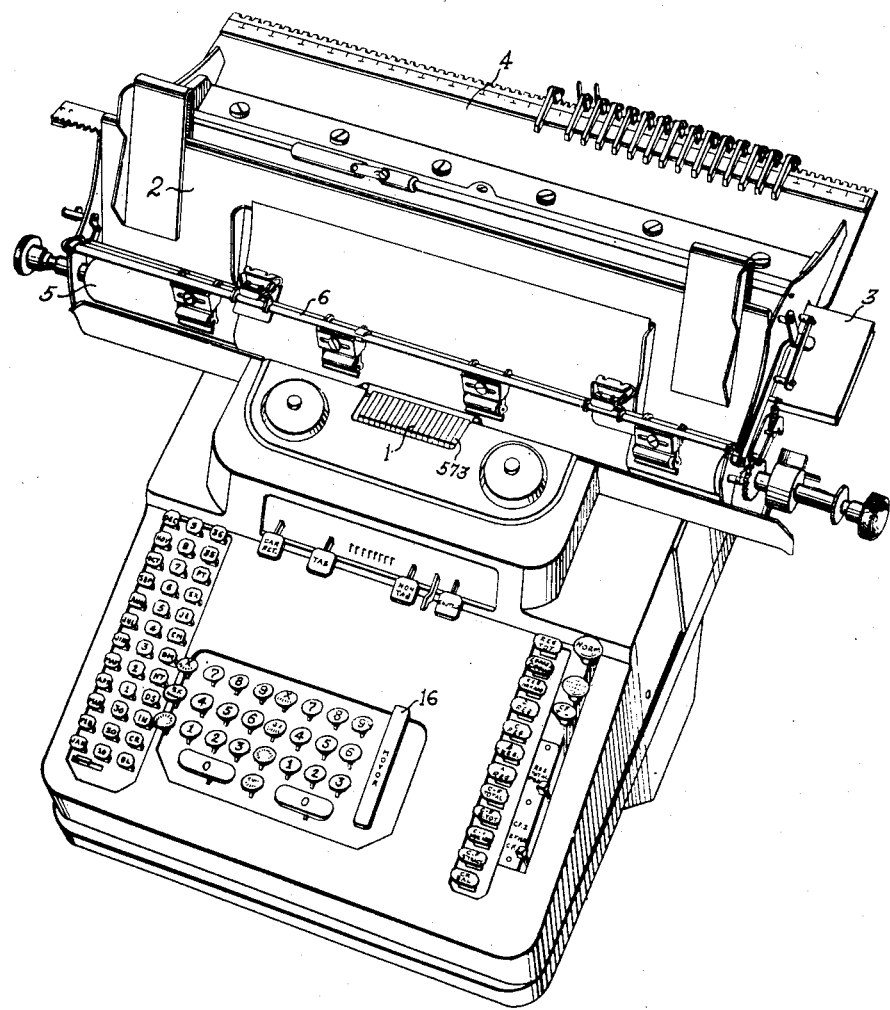

The description is divided into the following topics:

1. The machine sections and general actuating mechanism
2. Adding registers—In general
3. Crossfooters—In general
4. Crossfooter selection—In general
5. Selection of the upper crossfooter
6. Engagement of the upper crossfooter
7. Actuation of the upper crossfooter
8. Selection of upper and lower crossfooters for joint actuation
9. Engagement of upper and lower crossfooters for joint actuation
10. Joint actuation of upper and lower crossfooters
11. Selection, engagement and actuation of lower crossfooter alone
12. Subtracting in the crossfooters
13. Adding in one crossfooter while subtracting in the other
14. Taking a total from the upper crossfooter
15. Taking a sub-total in the upper crossfooter
16. Taking totals and sub-totals in the lower crossfooter
17. Locks to prevent depression of crossfooter total keys at improper times
18. Taking an overdraft total from the upper crossfooter
19. Taking an overdraft total from the lower crossfooter
20. Control of various operations by the paper carriage
21. Signal printing for lower crossfooter
22. Key release and restoring mechanism

1. The machine sections and general actuating mechanism

Referring to Figure 1, the machine includes a keyboard, type bars 1 for printing on the inserted paper, a laterally movable paper carriage indicated generally at 2, mounted on a track 3, and a control plate 4 mounted on the traveling paper carriage and having a plurality of control magazines secured to its under side for controlling the various operations of the machine in predetermined columnar positions. The carriage is provided with the customary roller platen 5 for the insertion of the paper at the rear thereof, and a bail structure 6 for use in feeding other paper sheets at the front thereof.

The machine also includes (Figure 2) eight adding registers arranged in two groups situated one above the other, there being four registers in each group. They are designated generally A, B, C and D in each group, and each includes a plurality of 10 tooth wheels 7. These registers are operable for adding only. Situated in front of these registers are two crossfooters, each having a plurality of 20 tooth wheels 11 and 12. The crossfooters are arranged for both addition and subtraction. The actuation of the registers and crossfooters is controlled by stop pins 13 that are projected into the path of a rod 14 by depression of the amount keys on the keyboard. The rod 14 is connected with the actuators in a manner to be later described. The conditioning of the machine for adding, subtracting, non-adding, total taking, sub-total taking, computing selectively in the various registers, etc., is controlled manually by the keys and levers situated at the right hand side of the keyboard (Figure 1). These various operations will be described in detail under appropriate headings.

The machine is actuated by an electric motor (not shown). The motor is started by the closing of suitable switch mechanism and is coupled with an actuating shaft 15 (Figure 2) by a suitable clutch mechanism upon depression of a motor bar 16 (Figure 1). The actuating shaft is connected with the motor drive in such a manner that it is rocked, first, counterclockwise (Figure 2), and then clockwise, about ninety degrees during each operation of the machine.

2. Adding registers—In general

The eight adding registers are each composed of a number of 10 tooth wheels, engageable with actuating racks 17 and 18 for their operation. The four registers in the upper group are provided with one set of transfer elements, and the four in the lower group with another set. The transfer elements for each set are identical. These registers per se, and their transfer elements, are identical with those shown in my application, Serial No. 581,800.

3. Crossfooters—In general

The two adding and subtracting crossfooters are each composed of a number of 20 tooth wheels 11 and 12 (Figure 2) engageable with actuating racks 261 and 262 for adding and subtracting respectively in the upper crossfooter, and with racks 263 and 264 for adding and subtracting respectively in the lower crossfooter. The two crossfooters are provided with separate identical sets of transfer elements. These crossfooters per se, together with their transfer elements, are identical with those shown in my application Serial No. 581,800, and therefore, will not be described in detail.

4. Crossfooter selection—In General

The crossfooters are selectively controlled for engagement with the actuators by a lever 265 (Figure 3). This lever is pivoted on a stud 266 and has a stud 267 on its lower arm. The lever 265 is movable to any one of three positions, as illustrated in Figures 3, 4 and 5. A pair of identical detent arms 268 are pivoted on a common stud 271 and each has three opposing notches adapted to embrace stud 267. A strong spring 272 holds the latch arms together to retain lever 265 in any moved position. The studs 266 and 271 are mounted on a plate 273 rigidly secured to the machine frame. When lever 265 is in the position shown in Figure 3, the upper crossfooter will be engaged for actuation. When the lever is in its intermediate position, as shown in Figure 4, both crossfooters will be engaged, and when the lever is in the position shown in Figure 5 the lower crossfooter will be engaged.

5. Selection of the upper crossfooter

Figure 7:
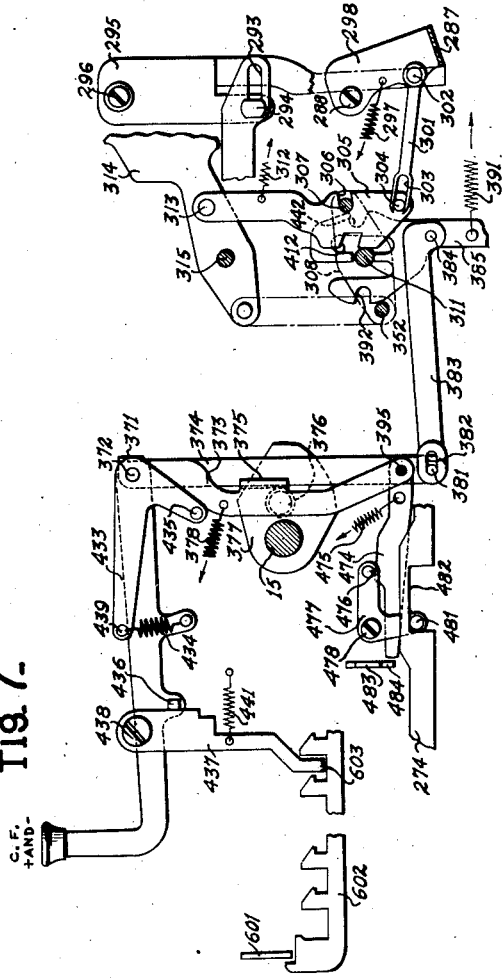

Referring to Figure 3, a slide 274 is pivoted on a stud 275 on the lower arm of lever 265 and is slidably mounted at its rear end on a stud 276 in the machine frame. A blocking plate 277 is pivoted on a stud 278 secured to the slide 274 and is tensioned clockwise of its pivot by a spring 281 fastened to the front end of the blocking plate and to an upwardly extending arm 282 on slide 274. This clockwise tension is restricted by another stud 283 secured to the slide 274 at the rear of stud 278, the blocking plate 277 having its lower edge arched so as to rest on the top of stud 283. The plate 277 also has a short arm 284 with a vertical rear edge. When the selecting lever 265 is in the position shown in Figure 3, this rear edge lies adjacent a stud 285 in an arm 286 of a bail 287 pivoted on an axis 288 (Figures 4 and 7). The actuating shaft 15 (Figure 3) has a short arm 291 on which is pivoted a link 292 having a slot 293 in its rear end to receive a stud 294 on a lever 295 pivoted on a stud 296 in the machine frame. The lower end of lever 295 (Figures 4, 5 and 7) lies in front of the yoke portion of bail 287. A strong spring 297 is secured to the other arm 298 of bail 287 and to the machine frame, tensioning the bail clockwise about its axis 288. This clockwise movement is limited, when the machine is at rest, by the lower end of lever 295 contacting bail 287. It will be noted that when the machine is at rest stud 294 lies in the forward end of slot 293. A link 301 (clearly shown in Figure 7) is pivoted on stud 302 on arm 298 and has a slot 303 embracing a stud 304 on the lower end of engaging link 305 for the upper crossfooter. Engaging link 305 has a notch 306 adapted to embrace a stud 307 (Figures 7, 8 and 9) on a rocker 308 pivoted on a stationary rod 311. It will be noted (Figure 7) that when the machine is at rest there is a gap between stud 304 and the rear end of slot 303, and the lower forward edge of engaging link 305 is adjacent the rod 311. A weak spring 312 is connected to the engaging link 305 and to the machine frame to tension the link counter-clockwise about its pivot on a stud 313 (Figures 7 and 9) on cam lever 314 pivoted on a stationary rod 315.

With the selecting lever 265 in the position shown in Figure 3, when the actuating shaft 15 is oscillated counter-clockwise, moving link 292 forward and thereby freeing bail 287 to the tension of spring 297 (Figure 7), stud 285 (Figure 3) is blocked against forward movement by contacting arm 284, in turn held against movement by spring 272 at the front of the machine. By thus holding bail 287 (Figure 7) in its rear position, engaging link 305 remains engaged with stud 307 which, as will later appear, is necessary to effect engagement of the upper crossfooter for actuation during the instant operation. At the end of the operation, the return of actuating shaft 15 to its normal position returns link 292 and lever 295 to their normal positions.

6. Engagement of the upper crossfooter

Referring to Figure 8, an actuating arm 316 is secured to actuating shaft 15 and has a pawl 317 pivoted on a stud 318 and tensioned clockwise about this stud from its position shown in Figure 8 by a spring 321 connected to one end of pawl 317 and to the actuating arm 316. A plate 322 is pivoted on a stationary stud 323 and has a stud 324 normally embraced by a hook 325 on pawl 317. A lever 326 is pivoted on a stationary rod 327 and is tensioned by a spring 328 for counter-clockwise movement about rod 327. A stud 331 lies within a slot in plate 322 to coordinate the movements of the plate and lever 326.

The lever 326 also carries a stud 332 to cooperate with a shoulder 333 on pawl 317. A stud 334 is secured to plate 322 and is embraced by a notch 335 in the rear edge of a pendant 336. The upper end of pendant 336 is pivoted on a stud 337 secured to a rocker 338 pivoted on a stationary rod 341. Another pendant 342 is pivoted on a stud 343 on the rear end of rocker 338 and has a notch 344 embracing a stud 345 on the rear end of another rocker 346 pivoted on stationary rod 315. A link 348 is pivoted on a stud 351 on the forward end of rocker 346 and on a stud 352 on the forward end of rocker 308. As before mentioned, cam lever 314 (Figure 9) is also connected to rocker 308 through link 305. A lever 353 is pivoted at 354 in the machine frame and is connected at its lower end to a pitman 355 connected directly to the upper crossfooter shaft. For the sake of brevity, the upper crossfooter wheels and the details of the pitman 355 are not shown in connection with these parts. For a full disclosure of this mechanism, reference may be had to my application, Serial No. 581,800. However, in Figure 8 a pitman 356 for the lower crossfooter, similar in every respect to pitman 355, illustrates the connection between the crossfooter and the lever 353.

When the machine is operated, the initial counter-clockwise movement (Figure 8) of actuating arm 316 rotates plate 322 counter-clockwise. This movement of plate 322 raises pendant 336 and lowers pendant 342. The lowering of pendant 342 oscillates rocker 346, raising link 348 and oscillating rocker 308. The oscillation of rocker 308 lowers engaging link 305 (Figure 9) and with it cam lever 314. This first movement of these parts is sufficient to bring the rockers 346 and 308 and lever 314 to their substantially horizontal positions. When lever 314 is in this position a stud 357 on the upper end of lever 353 lies in the middle portion 358 of the cam slot of lever 314. This movement of the parts causes lever 353 to oscillate sufficiently to move the upper crossfooter to a position equidistant from both sets of racks 261 and 262 (Figure 2). In this position the crossfooter is disengaged from both sets of racks and has its wheels held against rotary movement by an aliner similar to aliner 361 (Figure 8). The details of this aliner mechanism are not shown as they are fully disclosed in my U. S. Patent No. 1,965,611. However, the position occupied by the aliner mechanism when the crossfooter is disengaged is illustrated by the position of the lower crossfooter aliner mechanism in Figure 10.

The plate 322 (Figure 8) and its connections to the crossfooter remain in this position during the remainder of the counter-clockwise movement of actuator arm 316. At the end of this movement, the actuator arm and the other parts lie in their positions shown in Figure 10, where shoulder 333 lies directly in front of stud 332.

The first portion of return clockwise movement of actuator arm 316 moves stud 332 counter-clockwise about rod 327. This oscillates plate 322 clockwise and returns pendants 336 and 342, rockers 346 and 308, levers 314 and 353, and the crossfooter to their original positions, where the crossfooter is in engagement with adding racks 261 (Figure 2). The movement of these parts to their original positions takes place during the first increment of return movement of actuator arm 316, thereby leaving the major portion of the return stroke for the crossfooter actuator racks to perform their function now to be explained.

7. Actuation of the upper crossfooter

Referring to Figure 2, the main actuators 105 each have connected thereto a pair of racks 261 and 262. These racks are mounted for vertical sliding movement in stationary brackets 362 and 363. They are connected for movement with the actuators 105 by being mounted on arms 364 extending rearwardly from the actuators. The mounting includes a pair of studs 365 and 366 lying within slots 367 and 368 in the racks.

Movement of actuators 105 upwardly after the crossfooter is disengaged from the racks at the very beginning of the operation, as explained above, raises the racks until their corresponding rod 14 is arrested by one of the pins 13. The parts occupy this position during the remainder of the counter-clockwise movement of actuator arm 65. The first portion of the return stroke of arm 65 is accompanied by no movement of the actuators 105 because of the dwell portion 127 on lever 115. During this period, as explained above, the crossfooter is re-engaged with the racks so that subsequent downward movement of the racks will actuate wheels 11. At the end of the operation, the wheels remain engaged with the racks. The increment of movement possible between the actuators 105 and the racks 261 and 262 through the slots 367 and 368 is used for the purpose of transferring units from lower to higher orders. The details of the crossfooter itself, as well as the transfer mechanism, is fully shown and described in my application, Serial No. 581,800, and therefore will not be given here.

8. Selection of upper and lower crossfooters for joint actuation

When it is desired to accumulate in both crossfooters jointly, the crossfooter selecting lever 265 is moved to its intermediate position shown in Figure 4. When it is moved from the position shown in Figure 3 to this position, it pulls slide 274 and plate 277 forward, leaving a short gap between arm 284 and stud 285 on bail 287. When the machine is operated with the parts in this position, bail 287 moves forward under the tension of spring 297 (Figure 7) until stud 285 (Figure 3) strikes the rear edge of arm 284 which, because of the tension of spring 272 at the front of the machine, holds the bail against further forward movement. This distance that the bail is allowed to move forward is just sufficient to move the rear edge of slot 303 (Figure 7) into contact with stud 304. Since the weak spring 312 tends to pull the engaging link 305 rearward, notch 306 in link 305 remains in engagement with stud 307 on rocker 308 during the instant operation. As explained above, this connection results in the engagement of the upper crossfooter during the operation.

To select also the lower crossfooter for engagement, the following mechanism is provided. A bail 371 (Figure 7) is pivoted on a rod 372 and has two downwardly extending arms 373 and 374. Arm 373 has a laterally extending flange 375 lying in the vertical plane of a roller 376 mounted on an arm 377 secured to actuating shaft 15. A strong spring 378 is secured to arm 373 and to the machine frame and holds flange 375 against roller 376. The lower end of arm 374 carries a stud 381 lying within a slot 382 in the forward end of a link 383 pivoted at 384 to an engaging link 385 for the lower crossfooter. This engaging link is pivoted at 386 (Figure 8) at its lower end to a cam lever 387 pivoted on a rod 388. A weak spring 391 is connected to engaging link 385 and to the machine frame, and tensions the upper end of engaging link 385 toward the rear of the machine.

When a machine cycle begins, arm 377 rotates counter-clockwise, moving roller 376 toward the front of the machine. The tension of spring 378 then swings arm 374, link 383 and the upper end of engaging link 385 forward, engaging a notch 392 in the forward edge of the engaging link with stud 352, the stud at this point in the operation having already been brought to its intermediate position shown in Figure 10 at the very beginning of the cycle by the initial movement of plate 322, as above explained. It will be noted that spring 378 is strong enough to move these parts forward in opposition to the strength of spring 391. This engagement of notch 392 with stud 352 selects the lower crossfooter.

It is evident that unless some restraining mechanism is provided, spring 378 will engage notch 392 with stud 352 when cross footer selecting lever 265 (Figure 3) is in its forward position for selecting the upper crossfooter as well as when it is in its intermediate position for selecting both crossfooters for joint operation. The following parts are therefore provided to restrain the action of the spring when the lever 265 is in its forward position. A hook 393 (Figure 3) is pivoted on a stationary stud 394 and embraces a stud 395 on the lower end of arm 373 (Figure 7). The hook is tensioned counter-clockwise by a spring 396 (Figure 3) secured to the hook and to the machine frame. A pitman 397 is pivoted to hook 393 at 398 and is supported for sliding movement at its rear end by having a slot 401 embracing a stud 402 on an arm 403 of a bail 404 pivoted on a rod 405. For the present, however, we may consider arm 403 as being stationary. A stud 406 is secured on the rear portion of slide 274 and lies close to a shoulder 407 on pitman 397.

When the crossfooter selecting lever 265 is in its forward position where it selects the upper crossfooter, hook 393 embraces stud 395 and thereby prevents forward movement of arms 373 and 374, link 383 and engaging link 385, preventing engagement of the lower crossfooter during this operation. However, when selecting lever 265 is moved to its intermediate position (Figure 4) for selecting the crossfooters for joint operation, the forward movement of slide 274 causes stud 406 to engage shoulder 407 and move pitman 397 forward. This stretches spring 396 and raises the front end of hook 393 to its position shown in Figure 4, where it does not restrain forward movement of stud 395. Arms 373 and 374, link 383 and engaging link 385 are, therefore, freed to the tension of spring 378 for forward movement thereby, to engage the lower crossfooter during the instant operation.

9. Engagement of upper and lower crossfooters for joint actuation

In engaging both crossfooters for joint actuation, the upper crossfooter is engaged in exactly the same manner as explained above, the spring 312 (Figure 7) holding notch 306 in engagement with stud 307 during the operation, as also mentioned above. The lower crossfooter is engaged by stud 352 (Figure 8) moving engaging link 385 down and raising the rear end of cam lever 387. It will be observed that cam levers 314 and 387 for the upper and lower crossfooters respectively are similar in every respect and are connected for simultaneous and identical movement when engaging link 385 embraces stud 352, as shown in Figure 8. Since cam lever 387 is connected to the lower crossfooter through a pitman 356 and a lever 408 similar to the corresponding elements for the upper crossfooter, the lower crossfooter is engaged and disengaged simultaneously with the upper crossfooter during this operation.

10. Joint actuation of upper and lower crossfooters

Referring to Figure 2, the lower crossfooter is actuated, as mentioned above, by a pair of racks 263, 264 mounted on arms 411 extending rearwardly from the auxiliary actuators 228. These racks are mounted on the arms 411 and are supported for vertical sliding movement identical to the racks 261, 262 for the upper crossfooter. The lower crossfooter has also a separate set of transfer elements identical to and operating separately from the set for the upper crossfooter. Since, as explained above, the lower crossfooter is engaged and disengaged at the same times in the cycle as the upper crossfooter, and since the auxiliary actuators 228 receive a movement identical with actuators 105 for the upper crossfooter, the lower crossfooter is actuated similarly to the upper crossfooter.

11. Selection, engagement, and actuation of lower crossfooter alone

When it is desired to actuate the lower crossfooter to the exclusion of the upper crossfooter, the crossfooter selecting lever 265 is moved to the position illustrated in Figure 5. This moves arm 284 to a position forward of its position shown in Figure 4 so that there now appears a wide gap between it and stud 285. Now, upon operation of the machine, as actuating shaft 15 moves link 292 forward, spring 297 (Figure 7) pulls bail 287 and link 301 forward, causing the rear end of slot 303 to contact stud 304 and to then move engaging link 305 forwardly, disengaging notch 306 from stud 307 and engaging a notch 412 with rod 311 against the tension of weak spring 312, it being remembered that during the very first part of this operation, link 305 is lowered to a position where notch 412 lies opposite rod 311 by the initial counter-clockwise movement of plate 322 (Figure 8) and the resulting clockwise movement of rocker 308 to its horizontal position shown in Figure 10.

The movement imparted to slide 274 (Figure 5) by movement of the selecting lever 265 to its rear position also moves stud 406 to a position forward of its position shown in Figure 4. This additional movement merely results in swinging hook 393 an additional increment above stud 395 so that when roller 376 (Figure 7) moves away from flange 375, arms 373 and 374 swing forward, engaging notch 392 with stud 352 in the same manner as explained above when both crossfooters were selected for joint operation.

With notch 392 in the lower crossfooter engaging link 385 engaged with stud 352, and notch 306 in the upper crossfooter engaging link 305 disengaged from stud 307, the clockwise movement of plate 322 (Figure 8) at the beginning of the return stroke of the actuating shaft 15 will engage the lower crossfooter and leave the upper crossfooter disengaged. The subsequent actuation of the lower crossfooter takes place in the same manner explained above.

12. Subtracting in the crossfooters

Figure 11:
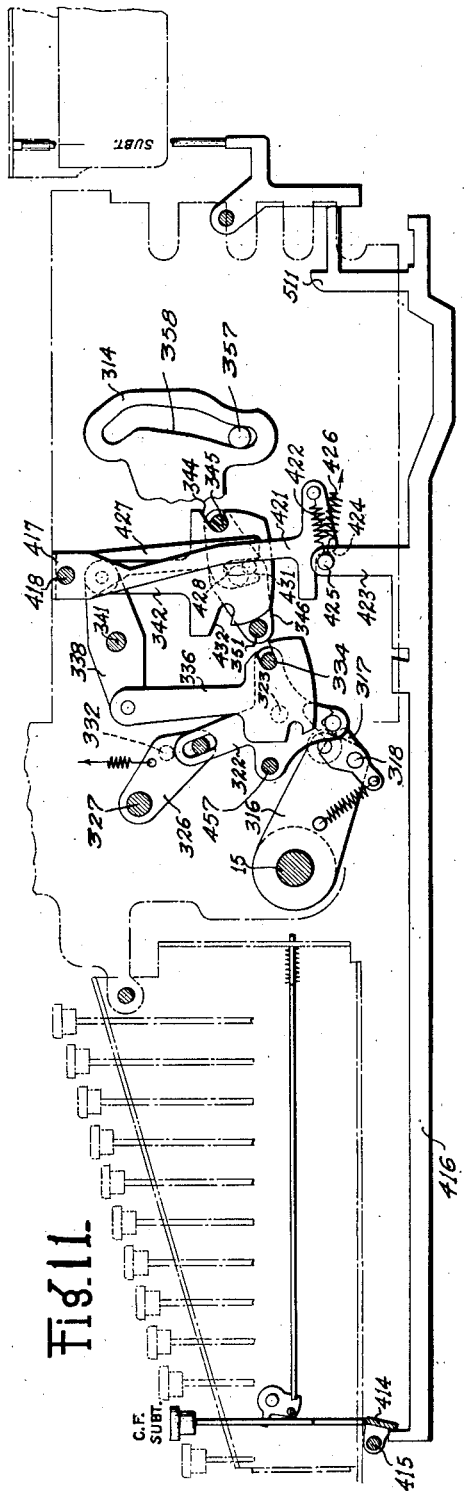

Referring to Figure 11, a crossfooter subtract key has the lower end of its stem resting on a bail 414 pivoted on a rod 415 similarly to the bails under the other keys in this bank. A slide 416 is mounted for movement forwardly and rearwardly of the machine and has a shoulder on its front end lying in front of bail 414. A bail 417 is pivoted on a rod 418 and has a downwardly extending arm 421 connected by a spring 422 to an upstanding arm 423 on the slide 416. The tension of spring 422 normally holds a shoulder 424 on the arm 421 in contact with a stud 425 on arm 423. A spring 426 normally holds slide 416 and arm 421 in their rearward positions shown in Figure 11. The other arm 427 of bail 417 likewise extends downwardly and has a fork 428 at its lower end embracing a stud 431 on pendant 342.

Figure 12:
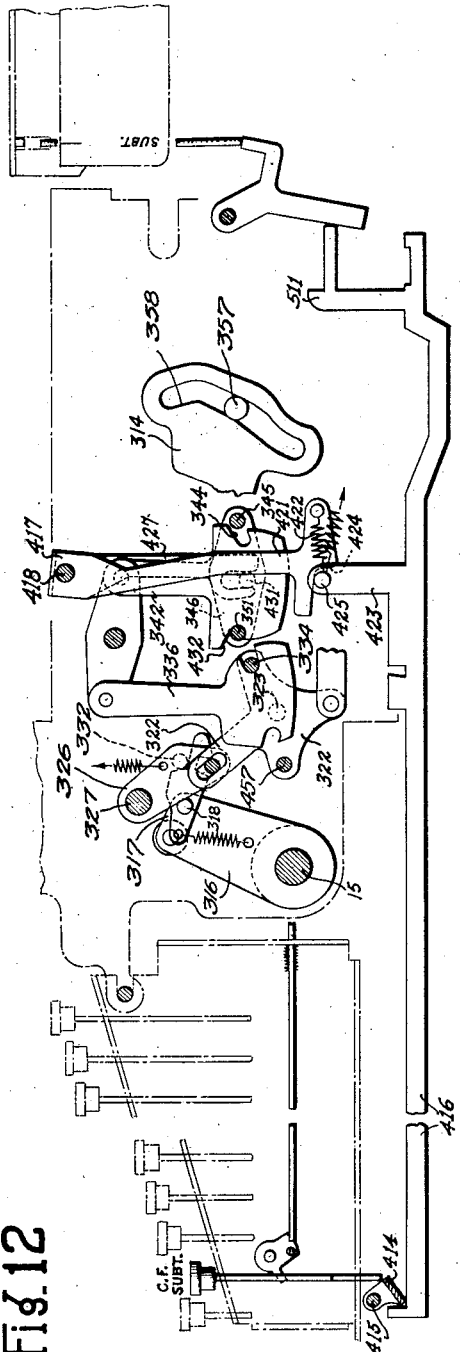

When it is desired to subtract rather than add in the crossfooters, the crossfooter subtract key is depressed, moving slide 416 forward and tensioning springs 422 and 426. Upon operation of the machine, counter-clockwise movement of plate 322 at the beginning of the operation lowers pendant 342 and moves rocker 346 to its horizontal position shown in Figures 10 and 12, as explained above. As soon as stud 351 arrives opposite a notch 432 in the forward edge of pendant 342, the tension of spring 422 pulls arms 421 and 427 and pendant 342 forward, engaging notch 432 with stud 351 and disengaging notch 344 from stud 345, as shown in Figure 12. Now upon the clockwise movement of plate 322 at the beginning of the return stroke of actuating shaft 15, instead of link 348 (Figure 8) being lowered to raise the cam levers 314 and 387, it will be raised to lower the cam levers. Now instead of levers 353 and 408 being rotated counter-clockwise as in adding operations, they are rotated clockwise by the upper ends of the cam slots in levers 314 and 387 engaging the crossfooters with the forward sets of racks 262 and 264 (Figure 2), for subtraction. During the remainder of the return stroke of the actuating shaft, the crossfooters are actuated by these racks. The crossfooters remain in engagement with the subtracting racks at the end of the operation, and until the beginning of the succeeding operation, at which time they are brought to their intermediate or disengaged position by the initial counter-clockwise movement of plate 322.

In the above explanation it was assumed that both crossfooters were engaged for the subtracting operation. If only one of them should be engaged, the parts would operate in the same manner as described except that the engaging link 305 or 385 (Figure 9) of the crossfooter not selected would not be operated to move the crossfooter into engagement with the subtracting racks after such engaging link was moved to its intermediate position shown in Figure 10.

13. Adding in one crossfooter while subtracting in the other

Referring to Figure 7, a crossfooter plus and minus key is provided to make it possible to add an amount in the upper crossfooter and simultaneously subtract it from the lower crossfooter, or by a joint depression of this key and the crossfooter subtract key, subtract an item from the upper crossfooter and simultaneously add it to the lower crossfooter. The crossfooter plus and minus key is pivoted on rod 372 and is connected to a bell crank 433 by a spring 434 superior to spring 376. A stud 439 on the forward end of bell crank 433 normally rests on the crossfooter plus and minus key to form a stop for the relative motion of these two parts under the tension of spring 434. Bell crank 433 has another stud 435 on its lower arm lying in the vertical plane of arm 373. The crossfooter plus and minus key is latched in depressed position by a stud 436 thereon, engaging a notched lever 437 pivoted at 438 to the machine frame and tensioned rearwardly by a spring 441. Depression of this key first moves stud 435 into contact with arm 373 and then moves arm 373 rearwardly until stud 381 on its lower end is stopped by contacting the rear end of slot 382. Continued depression of the key to its fully depressed position stretches spring 434.

Upon operation of the machine, when rocker 308 moves to its horizontal position at the beginning of the operation, as above described, lowering stud 307 in line with a notch 442 in the rear edge of engaging link 385, the tension of spring 434 forces engaging link 385 rearwardly, engaging notch 442 with stud 307. Now, with both engaging links 305 and 385 for the upper and lower crossfooters engaged with stud 307, a raising of the stud at the beginning of the return stroke of the actuating shaft will raise cam lever 314 to engage the upper crossfooter for addition, and will lower cam lever 387 (Figure 8) for subtraction in the lower crossfooter.

Similarly if for this operation the crossfooter subtraction key also is depressed, stud 307 will be lowered instead of raised, and engaging links 305 and 385 will be lowered, causing cam lever 314 to be lowered for subtraction in the upper crossfooter and cam lever 387 to be raised for addition in the lower crossfooter.

14. Taking a total from the upper crossfooter

When it is desired to take a total from the upper crossfooter, it is necessary to put the machine through a blank cycle with the crossfooter selecting lever 265 (Figure 3) in its forward position, for the dual purpose of restoring any tripped transfer elements and for engaging the crossfooter with its actuating racks, as explained above in connection with taking a total from the adding registers. With lever 265 in this position, engaging link 305 (Figure 7) for the upper crossfooter remains engaged with stud 307 during the operation, for engaging the upper crossfooter, and engaging link 385 for the lower crossfooter remains disengaged from stud 352 to keep the lower crossfooter disengaged.

To change the timing of the crossfooter engaging mechanism for total taking operations, a crossfooter total key (Figure 13) is provided. The lower end of this key rests on a bail 443 pivoted on a rod 444 similarly to the other bails, and lies directly behind a shoulder on the forward end of a slide 445. The slide is mounted for forward and rearward movement in the machine, and has an upwardly extending portion 446 with a rearwardly extending arm 447. A bail 448 pivoted on a rod 451 has a stud 452 on one of its arms 453. A strong spring 454 is connected to the slide 445 and to stud 452 to normally hold arm 447 in contact with the stud. A weaker spring 455 secured to the upper end of arm 453 and to the machine frame normally holds the arm and slide 445 in their rear positions. A link 456 is pivoted on the upper end of the other arm (similar to arm 453) of bail 448 and to the lower end of pendant 336.

When the crossfooter total key is depressed, slide 445 moves forward, and because of the tension of spring 454 pendant 336 is pushed forward, disengaging stud 334 from its notch in the pendant. The movement is arrested by the forward edge of the pendant striking a stud 457 on plate 322. This arrests movement of stud 452 so that the continued depression of the total key to its fully depressed position moves arm 447 forwardly away from the stud, stretching spring 454. Upon operation of the machine, the initial counter-clockwise movement of plate 322 at the very beginning of the operation moves stud 457 opposite a notch 458 in the forward edge of pendant 336, at which time spring 454 moves the pendant an additional increment forward to engage the stud with the notch. During the remainder of the counter-clockwise movement of actuating shaft 15, the total is taken from the crossfooter wheels in the manner described in my application Serial No. 581,800. At the beginning of the return stroke of the actuating shaft, shoulder 333 raises stud 332 and thereby rotates plate 322 clockwise, as explained above, raising stud 457, and with it pendant 336. This disengages the upper crossfooter from the actuating racks as required before they begin their return movement.

15. Taking a sub-total in the upper crossfooter

Figure 13:
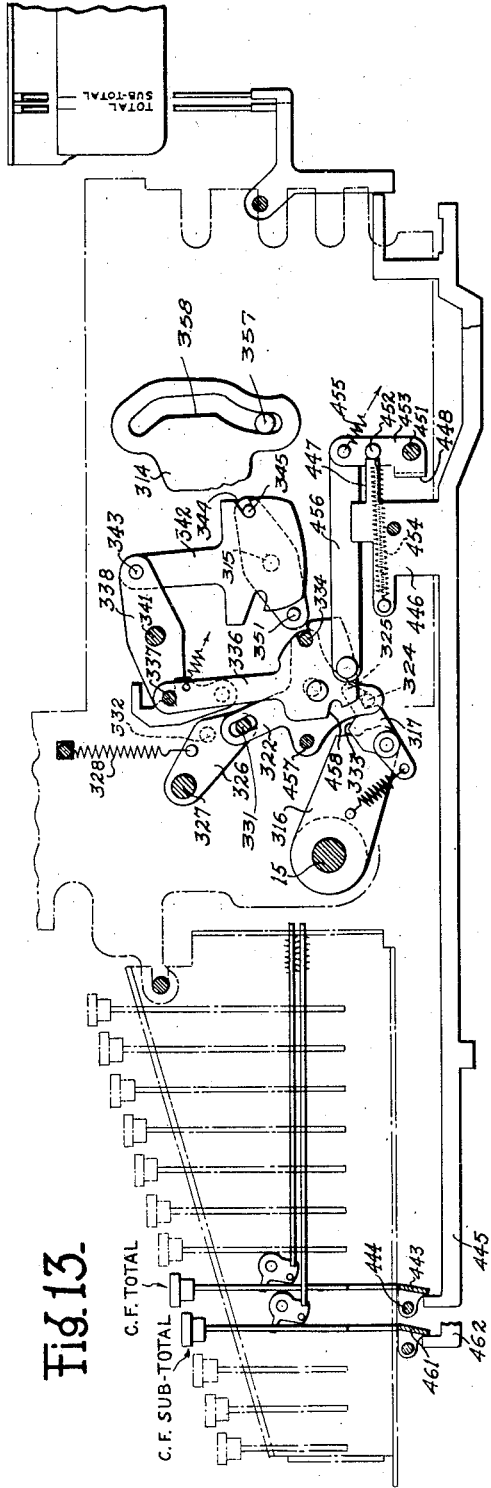
Figure 14:
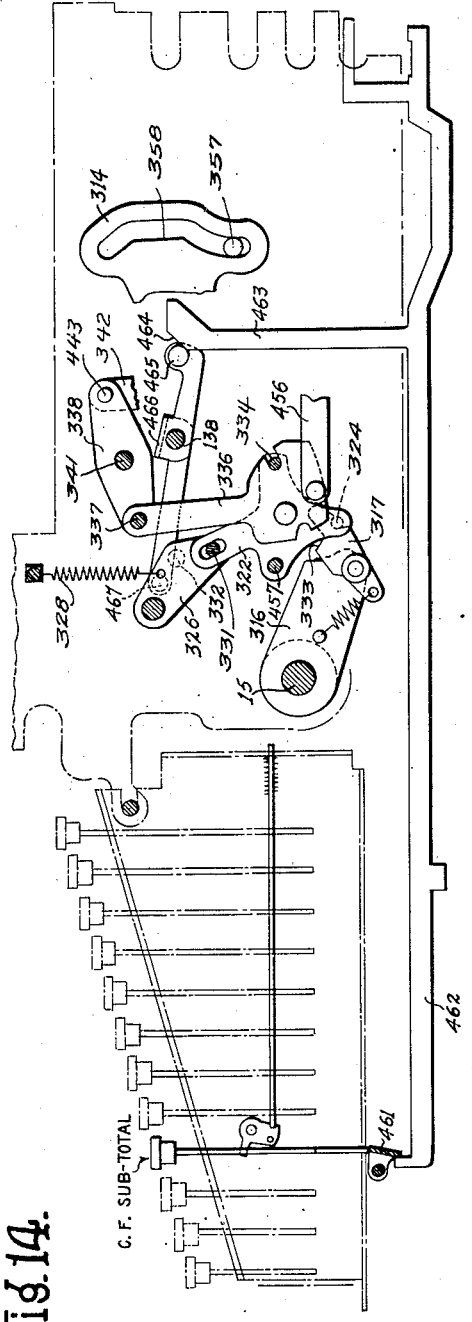

Referring to Figure 14, a crossfooter sub-total key has its lower end resting on a bail 461 pivoted similarly to bail 443 (Figure 13) and lying behind a shoulder on the forward end of a slide 462 mounted for forward and rearward movement in the machine similarly to slide 445 (Figure 13). Slide 462 has an upstanding arm 463 with a cam surface 464 contacting a stud 465 on the rear end of a bailed lever 466 pivoted on the rod 138. The forward end of lever 466 carries a stud 467 lying in the same vertical plane as stud 332. By the above described connections, depression of the crossfooter sub-total key lowers stud 467 to the position shown in Figure 16, where it prevents shoulder 333 on pawl 317 from engaging stud 332.

Referring to Figure 15, two links 468 and 471 are loosely connected at their upper ends to the crossfooter total and sub-total keys respectively, and at their lower ends to bails 443 and 461 respectively. A forwardly extending arm 472 is rigidly secured to link 468 and extends under a stud 473 on link 471. By these connections, depression of the crossfooter sub-total key depresses link 468 and also the crossfooter total key.

When these two keys are depressed with the crossfooter selecting lever 265 in its forward position shown in Figure 3, and the machine then operated, the upper crossfooter remains engaged with the actuating racks during their initial movement, the same as described above for the total taking operation. However, when the actuating shaft begins its return stroke, stud 467 (Figure 16) prevents pawl 317 from raising stud 332 and pendant 336 to disengage the crossfooter, allowing it to remain engaged while the actuating racks are returned to their initial position, as required. At the very end of the return stroke of the actuating shaft, hook 325 engages stud 324 and rotates plate 322 clockwise to its normal position shown in Figure 13.

16. Taking totals and sub-totals in the lower crossfooter

When it is desired to take a total or sub-total from the lower crossfooter, the crossfooter selecting lever 265 (Figure 3) must be moved to its rear position shown in Figure 5 and the machine cycled through a blank operation to restore any tripped transfer elements, as explained above, and to engage the lower crossfooter for total taking. After an operation, with the lever 265 in this position, the lower crossfooter engaging link 385 (Figure 7) is connected with stud 352 to properly shift the lower crossfooter during the total taking operation, while the upper crossfooter engaging link 305 is disconnected from stud 307 and connected with rod 311 to keep the upper crossfooter idle during the operation. Now, upon depression of the crossfooter total or sub-total key and operation of the machine, the total or sub-total will be taken from the lower crossfooter in the same manner as explained in connection with the upper crossfooter.

17. Locks to prevent depression of crossfooter total keys at improper times

As mentioned above, a lock is provided to prevent depression of the crossfooter total keys until after a blank cycle is taken. This mechanism is fully shown and described in my application Serial No. 581,800, and, therefore, need not be described here.

Another lock is provided to make it possible to take a total from the upper crossfooter with the crossfooter selecting lever 265 in its intermediate position where it selects both crossfooters for joint actuation in accumulating operations. It is advantageous to take a total from the upper crossfooter when the lever is in this intermediate position, but since an erroneous total would be given if both crossfooters were engaged during the total taking operation, this additional lock is provided for preventing the lower crossfooter from engaging during total taking operations. Since during total taking operations no amount keys are depressed, this lock is made dependent for its operation upon whether or not amount keys are depressed for an operation. If an amount key is depressed, the lock is disabled so that the lower crossfooter will engage, and if no amount keys are depressed, the lock will be effective to prevent engagement of the lower crossfooter so that a total may be taken from the upper crossfooter during the next operation.

This lock includes a bar 474 (Figure 7) pivoted on the stud 395 on the lower end of arm 373. A spring 475 is secured to bar 474 and to the machine frame to normally hold the bar elevated in the position shown in this figure. Upward movement of the bar is limited by a stud 476 on a bell crank 477 pivoted on a stud 478. A stud 481 on the lower arm of bell crank 477 rests against the top edge of a notch 482 in slide 274. A slide 483 (see also Figure 23) extends laterally of the machine and has a narrow finger 484 extending downwardly from its lower edge and lying directly in front of bar 474. As fully described in my application Serial No. 581,800, the setting up of a digit on the amount keyboard causes a slide corresponding to slide 483 to move one step laterally of the machine (to the right in Figure 23). This step of movement is sufficient to withdraw finger 484 from the path of forward movement of bar 474. By these connections, when crossfooter selecting lever 265 is in its intermediate position shown in Figure 4 to accumulate on the crossfooters jointly, the setting up of an amount on the keyboard moves finger 484 away from its position in front of bar 476 so that upon operation of the machine, this bar, arms 373 and 374 (Figure 7), link 383 and engaging link 385 for the lower crossfooter are allowed to move forward to engage the lower crossfooter for accumulation. However, if a total is to be taken, the blank cycle required immediately preceding the total taking operation is executed with the finger 484 in the path of bar 474, so that at the end of the cycle the lower crossfooter is disengaged. The total taking operation may now be effected to take the total from the upper crossfooter.

In explaining how a total is taken from the lower crossfooter, it was stated that the lower crossfooter is engaged during a blank operation. It is, therefore, necessary that the finger 484 be ineffective when selecting lever 265 is in its rear position for selecting the lower crossfooter for a total taking operation. To accomplish this the notch 482 (Figure 5) is so proportioned and situated that when lever 265 is moved from its intermediate to its rear position the rear edge of notch 482 moves stud 481 forward and stud 476 down. This lowers the front end of bar 474 beneath finger 484 so that bar 474 and its connected parts may move forward to engage the lower crossfooter.

A further lock is provided to insure that the crossfooter from which the total is to be taken is engaged at the beginning of the total taking operation. This insurance is given by the provision of a mechanism that locks the total key against depression whenever the selecting lever 265 is moved from one of its two forward positions, where it selects the upper crossfooter for total taking, to its rear position where it selects the lower crossfooter for total taking, or vice versa. With such a lock it is apparent that a total taking operation must be performed with the selecting lever 265 in a position to select the same crossfooter that was left engaged at the end of the preceding operation.

Referring to Figure 25, a plate 485 is pivoted on a stud 486 and has a latch 487 pivoted thereto on a stud 488. A spring 491 is connected to the latch and to the lower end of a lever 492 pivoted on a stud 493 and having a flange 501 normally bearing against the forward edge of plate 485. Lever 492 is connected at its upper end to a pitman 494 mounted at its rear end on a stationary stud 495 for forward and rearward sliding movement. The rear end of pitman 494 lies in the vertical plane of the arm 291, and lies at such distance from the arm that when actuating shaft 15 is rotated counter-clockwise, arm 291 moves pitman 494 a short distance forward.

By these connections, whenever selecting lever 265 is moved from either of its two forward positions to its rear position, or vice versa, a stud 497 on the lower end thereof passes over a tooth 498 on the lower edge of plate 485 and raises the plate a short distance. Spring 491 thereupon pulls the lower end of lever 492 forward, engaging a laterally extending flange 501 with a notch 502 in the rear end of plate 485, holding the plate in its upper position. This raising of plate 485 likewise raises latch 487, engaging a notch 503 with a hook 504 (see also Figure 15) secured to bail 443 that lies under the crossfooter total key. Therefore, whenever the selecting lever 265 is moved from one of its two forward positions to its rear position, or vice versa, the crossfooter total key, and also (because of arm 472, Figure 15), the crossfooter sub-total key, are locked against depression, and remain so locked until the machine is again operated to release flange 501 from notch 502 to allow spring 491 to return plate 485 to its lower position.

To prevent the operator from defeating this lock by first pressing one of the total keys and then moving lever 265, plate 485 is provided with an extended portion 505 on its upper edge. This portion lies directly beneath hook 504 when the hook is moved rearwardly and downwardly by depression of one of the total keys, making it impossible for stud 497 to move tooth 498 out of its path, and thus preventing movement of the selecting lever from either of its two forward positions to its rear position, or vice versa.

*18. Taking an overdraft total from the upper crossfooter*

This mechanism in general is disclosed in my application Serial No. 581,800, but since several changes in its operation are made, description of the necessary portion of this mechanism will be given.

When there is a negative total or overdraft in the crossfooter, and said total or overdraft is to be printed, it is necessary that the crossfooter be engaged with the subtracting racks instead of with the adding racks at the conclusion of the blank or spacing stroke. This result can be effected by holding the subtraction key depressed during the spacing stroke. Inasmuch, however, as it is desired that this mechanism be fully automatic, means is provided for automatically maintaining the crossfooter in condition for a negative total when it contains such a total.

This mechanism includes a slide 506 (Figure 17) guided for horizontal reciprocation longitudinally of the machine, said slide being impelled forward by a spring 507. On the rear end of slide 506 is an arm 508 (Figure 21) arranged to engage an upstanding arm 511 (Figures 11 and 17) on the slide 416 operated by the subtraction key, for the purpose of pushing slide 416 forward into effective position. After each operation of slide 506 it is restored to its normal rear position by a cam 512 secured to the actuating shaft 15, the cam engaging a roller 513 on slide 506 near the end of the return stroke of the actuating shaft. The slide 506 is prevented from operating to push the slide 416 into effective position except when there is a negative balance or overdraft in the crossfooter. An overdraft slide 514 (Figure 21) movable transversely of the machine, carries an upstanding post 515 lying normally in the path of a shoulder 516 on the slide 506 to prevent said slide from moving forward under the influence of its spring 507. A spring 517 connected to slide 514 and to the machine frame tends to move the latter to the left to remove post 515 from the path of shoulder 516.

When there is a positive balance in the crossfooter, the slide 514 is prevented from moving under the influence of spring 517 to release slide 506, by a stop arm 518 (see also Figure 22) fixed to a bail 521 pivoted on a rod 522. The upper end of bail 521 is arranged to be moved by a link 523 whenever the crossfooter passes through zero in either direction. When passing from positive to negative, link 523 moves to the right (Figure 22) thereby lowering stop arm 518, and when passing from negative to positive it raises stop arm 518 to the position shown in Figure 22. A lever 524 is pivoted on slide 514 at 525 and is tensioned counter-clockwise (Figure 21) by a spring 526 connected to the lever and to slide 514. A stud 527 on slide 514 restrains lever 524 in the position shown in Figure 21. A short flange 528 (Figure 18) is turned on the left end of lever 524 and lies normally in the same horizontal plane as the end of stop arm 518. Thus, when there is a positive balance in the crossfooter, lever 524 and slide 514 are held by stop arm 518 in position to prevent slide 506 from moving forward, and when there is a negative balance in the crossfooter, slide 514 is permitted to move to the left under the influence of spring 517 to allow slide 506 to pull slide 416 (Figure 11) forward to condition the crossfooter for subtraction.

In operations where slide 514 is permitted to move to the left (Figure 21), it is restored to its right hand or normal position at the very end of the same operation by a lever 531 (Figures 18, 19 and 20) pivoted at 532 on a stationary bracket 533 and operated by an upturned lug 534 thereon lying in the path of rearward movement of the rear end of slide 506. As slide 506 returns to its rear position, it contacts lug 534 and swings lever 531 about its pivot, causing the other end of the lever to strike a stud 535 on slide 514 and move the slide to the right (Figure 19). Therefore, if during this same operation the crossfooter is returned from a negative to a positive condition, stop arm 518 will be allowed to rise from under lever 524 to prevent movement of slide 514 to the left (Figure 21) during the next operation.

A means is also provided to prevent slide 506 from moving forward during amount entering operations, when there is a negative balance in the crossfooter. It is obvious that if the slide were not prevented from moving forward in such a condition, the amount would be subtracted rather than added. This means includes a shoulder 536 (Figure 23) on the upper edge of slide 483 lying normally out of the path of the forward end of slide 506. As mentioned above, and as fully disclosed in my application Serial No. 581,800, the entry of an amount on the keyboard causes slide 483 to move one step to the right. Such a movement places shoulder 536 in the path of slide 506 and thereby prevents a forward movement thereof during the ensuing operation.

By the above described mechanism it is apparent that when the crossfooter contains a negative balance, post 515 (Figure 21) will be out of the path of forward movement of slide 506, allowing this slide to pull slide 416 forward to engage the crossfooter with its subtracting racks during the blank cycle preparatory to the taking of a total. With the crossfooter engaged with the subtraction racks, depression of the total key and operation of the machine in the customary manner will result in a proper negative total being taken.

19. Taking an overdraft total from the lower crossfooter

To take an overdraft total from the lower crossfooter, it is necessary, as in the case of the upper crossfooter, to have the crossfooter engaged with its subtraction racks instead of its addition racks. Since the actual engaging of the lower crossfooter with the subtraction racks is controlled by a movement of the same slide 416 as was involved in engaging the upper crossfooter with its subtraction racks, it is only necessary to provide sufficient additional mechanism to cause the presence of a positive balance in the lower crossfooter to hold slide 514 (Figure 21) against movement to the left, and to cause the presence of a negative balance to allow slide 514 to move to the left to cause engagement with the subtraction racks.

This mechanism includes (Figure 22) a bail 537 similar to bail 521, to which is secured an arm 538 having a pivotal connection with the lower end of a pitman 541. The upper end of the pitman is slidably supported on a stationary stud 542 and has a laterally turned stop arm 543 lying in the same horizontal plane as stop arm 518. When the lower crossfooter passes from positive to negative, a link 544 is moved to the right, and when the crossfooter passes from negative to positive, it is moved to the left in the same manner as above described in connection with link 523. This has the effect of lowering and raising stop arm 543 similarly to the movements of arm 518. Referring to Figure 21, a tail 545 on the right end of lever 524 extends past slide 274 and, referring to Figure 3, lies a short distance in front of an upwardly extending arm 546 on the slide. By these connections, when lever 265 is moved from one of its two forward positions to its rear position for selecting the lower crossfooter, arm 546 moves tail 545 forward, swinging (Figure 21) the left end of lever 524 rearwardly against the tension of spring 526 until it lies opposite stop arm 543. Now, upon operation of the machine through the blank cycle, slide 514 will be prevented from movement to the left if the balance in the lower crossfooter is positive, and will be allowed to move to the left if the balance is negative. As in connection with the upper crossfooter, movement to the left allows slide 506 to move forward for engaging the crossfooter with the subtraction racks.

Upon depression of the total key and operation of the machine in the customary manner, a proper total will be taken from the lower crossfooter whether it is positive or negative.

20. Control of various operations by the paper carriage

The paper carriage, indicated generally at 2 in Figure 1, may control the various registers and crossfooters by suitable mechanism cooperating with the control plate 4 that travels with the carriage. As explained in my application Serial No. 581,800, this control mechanism includes magazines removably connected to the control plate in the various tabular positions of the carriage, and carrying one or more depending lugs cooperating with depressible levers. Selective depression of these levers, the ends of which are numbered 547 (Figure 3), depresses rods 548 resting on bell cranks 551. The lower ends of these bell cranks rest against the rear ends of the slides such as 511 (Figure 11) connected to the various control keys. By this train of connections, movement of the paper carriage into a columnar position selectively depresses rods 548 and shifts their corresponding slides forward the same as though their corresponding keys had been depressed manually. Since these connections are the same as illustrated in my application Serial No. 581,800, a further explanation of them will be given only insofar as the new mechanism is concerned.

A special control is provided so that the paper carriage may select the lower crossfooter when the crossfooter selecting lever 265 is in position to select the upper crossfooter. In doing this, it is necessary for the carriage to adjust the same elements adjusted by selecting lever 265 when moved to its position shown in Figure 5. Referring to Figure 3, these adjustments are, the raising of hook 393 from stud 395, the moving of arm 284 from the path of forward movement of stud 285, the lowering of bar 474 from behind finger 484 and the shifting of tail 545 forward for the control of overdraft balances. To accomplish this the following mechanism is provided.

Figure 6:
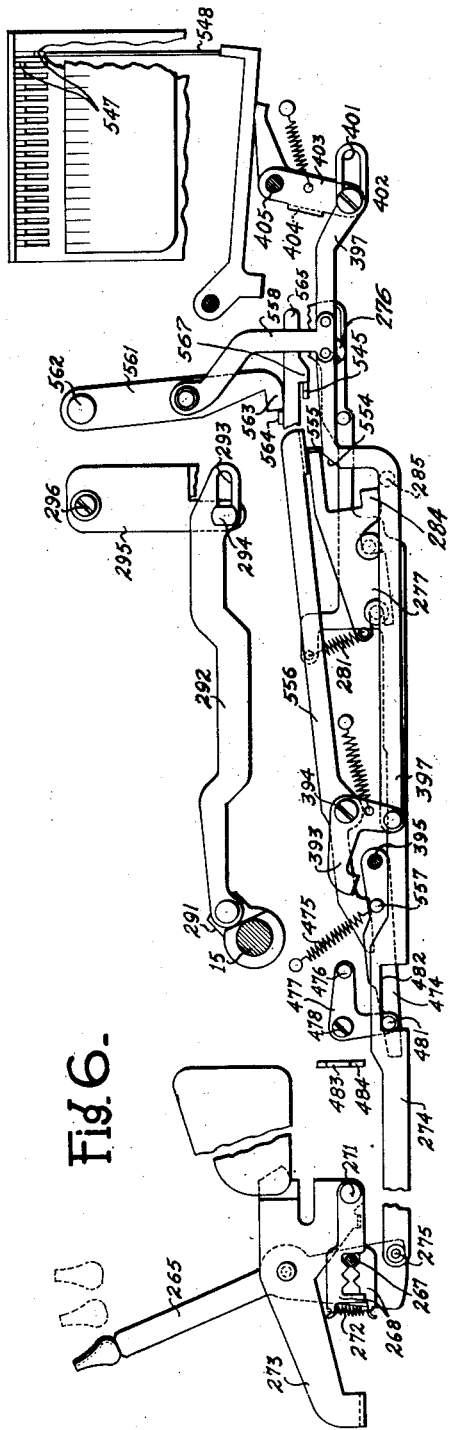

The above described bail 404 (Figure 3) is arranged to be swung forward by depression of rod 548 situated under the rearmost carriage control lever 547. Forward movement of bail 404, as shown in Figure 6, shifts pitman 397 forward, raising hook 393 from stud 395. The forward movement of pitman 397 also, by means of a cam surface 554 thereon bearing against a lateral flange 555 on plate 277, raises the rear end of the plate against the tension of spring 281 (compare Figures 3 and 6) sufficiently to move arm 284 above the path of forward movement of stud 285. The upward movement of flange 555 also rocks a lever 556 pivoted on stud 394. Since the forward end of this lever rests on a stud 557 on bar 474, the bar is depressed. An arm 558 secured to pitman 397 has a pin and slot connection with a lever 561 pivoted on the frame at 562 and having a finger 563 on its lower end lying behind a flange 564 on a slide 565 (see also Figure 3) tensioned rearwardly by a spring 566. A shoulder 567 extends downwardly from the lower edge of slide 565 and lies behind tail 545. By these parts, forward movement of pitman 397 shifts tail 545 forwardly as desired.

In the above manner the controls for engaging the lower crossfooter to the exclusion of the upper crossfooter are operated under the control of the paper carriage.

It might be noted that if slide 565 (Figure 3) were allowed to remain in the position shown in this figure when lever 265 is adjusted from its forward to its intermediate position, lever 561, through slide 565, would move tail 545 forward. Since, as explained above, totals are taken from the upper crossfooter with lever 265 in the intermediate position, it is desired that tail 545 remain in its rear position when the lever is so adjusted. A means is therefore provided to raise the rear end of slide 565 to bring flange 564 above finger 563 as soon as lever 265 leaves its forward position. This means includes a stud 568 secured to arm 546, and lying directly behind a beveled rear edge on shoulder 567. With this arrangement, the first increment of rearward movement of lever 265 raises flange 564 above finger 563. Therefore, by the time stud 406 on slide 274 closes the small gap between itself and shoulder 407 (compare Figures 3 and 4), to begin moving pitman 397 forward, finger 563 will be rendered ineffective for moving tail 545 forward.

21. *Signal printing for lower crossfooter*

A mechanism is provided to print a signal whenever a total or sub-total is taken from the lower crossfooter. This mechanism causes a signal, consisting of two square dots (Figure 24), to be printed by a special type 571 operated by a printing hammer 572 for the right hand type bar 573 (Figure 27). As shown in this figure, the type 571 has a lateral flange 574 extending into the vertical plane of type hammer 572. The flange 574, however, normally lies below the path of movement of the type hammer, as shown in Figure 24. Therefore, it is only necessary to oscillate type 571 sufficiently to raise its front end into the path of hammer 572 to cause the signal to be printed. To accomplish this, a block 575 (Figure 27), in which type 571 is slidably supported, has a short shaft 576 extending through an opening in the rear of a stationary bracket 577. A lever 578 is secured to the outer end of shaft 576 and is pivoted to a link 581. A bail 582 pivoted on rod 182 has a horizontal arm 583 (Figure 24) connected to the lower end of link 581 and a downwardly extending arm 584. To cause type 571 to print only when a total or sub-total is taken from the lower crossfooter, parts are provided to make the moving of type 571 into operative position depend upon movement of selecting lever 265 to its rear position, jointly with depression of one of the crossfooter total keys. This mechanism includes a cam link 586 having a pin and slot connection with arm 546 and lying normally in the dot and dash position shown in Figure 24. A cam slot 587 is cut in the forward end of link 586 and embraces a stud 588 on the lower end of arm 584. The forward end of link 586 also carries a square stud 591 lying in the vertical plane of a sector arm 592 pivoted at 593 to the machine frame.

Movement of selecting lever 265 to its rear position to select the lower crossfooter thereby shifts link 586 forward to its full line position shown in Figure 24 where, because of the upturned rear portion of cam slot 587, stud 591 is allowed to drop in front of the forward edge of sector arm 592. Referring now to Figure 26, sector arm 592 carries a long stud 594 connected with the upstanding portion 446 of slide 445 associated with the crossfooter total key. This connection consists of a strong spring 595 extending between stud 594 and a lateral flange 600 on an arm 596 pivoted on the portion 446. By this arrangement, depression of the total key or (because of arm 472, Figure 15) the sub-total key moves sector arm 592 forward. Since at this time stud 591 is in front of arm 592, link 586 is drawn forward, rocking bail 582 and thereby placing type 571 in alinement with hammer 572. The forward movement just described for link 586 is possible because of the pin and slot connection at its rear end. A spring 597 returns link 586 to its full line position shown in Figure 24 as the depressed total key is released at the end of the operation. Bail 582 is returned by a spring 598, and type 571 (Figure 27) is returned by a spring 599.

22. *Key release and restoring mechanism*

All the depressed keys, including the crossfooter plus and minus key (Figure 7), are returned to their undepressed positions at the end of each machine cycle by a bar 601 extending across the front of the machine. This bar and its operation are fully shown and described in my application Serial No. 581,800, and therefore, need only be mentioned here. When operated, the lower edge of this bar is swung forward, moving slides such as 602 forward to release the various keys. To release the crossfooter plus and minus key, a lateral flange 603 is provided on the lower end of lever 437 and lies in front of one of the upstanding lugs on slide 602. Therefore, when this slide is moved forward, lever 437 is carried forward, disengaging stud 436 from its notch to allow spring 434 to return the key.

Although reference to my application Serial No. 581,800 is given a number of times in the preceding description, it was not given in every instance where a more complete reference to many of the parts may be found. It is, therefore, to be understood that wherever the disclosure is inadequate for a complete understanding of the invention, such reference should be resorted to.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, two totalizers, actuators therefor, means to engage the totalizers with the actuators, and means for selectively connecting the totalizers with the engaging means, the connecting means including a disengaging member for one totalizer, means tending to move the member to effective position during every operation, an engaging device for the other totalizer, means tending to move the device to effective position during every operation, a latch to hold the device in ineffective position, a manipulative totalizer selecting member, and means controlled by the manipulative member for blocking movement of the disengaging member when the manipulative member is in one position, for holding the latch withdrawn and also blocking movement of the disengaging member when in a second position, and for holding the latch withdrawn when in a third position.

2. In a machine of the class described, two totalizers, actuators therefor, means to control total taking, cycling means, means for selectively controlling the meshing of the totalizers with the actuators, the controlling means having a manipulative member having one position wherein it selects one totalizer, a second position wherein it selects both totalizers, and a third position wherein it selects the other totalizer, and lock means provided on the manipulative member arranged to prevent operation of the total taking control means in the instant cycle when the manipulative member is moved from its second position to its third position, or vice versa.

3. In a machine of the class described, two totalizers, actuators therefor, means to engage the totalizers with the actuators, and means for selectively connecting the totalizers with the engaging means, the connecting means including a disengaging member for one totalizer, means tending to move the member to effective position during every operation, an engaging device for the other totalizer, means tending to move the device to effective position during every operation, a restraining means to hold the device in ineffective position, a manipulative totalizer selecting member, and means controlled by the manipulative member for blocking movement of the disengaging member when the manipulative member is in one position, and for rendering the restraining means ineffective when in another position.

OSCAR J. SUNDSTRAND.